United States Patent Office 3,520,081
Patented July 14, 1970

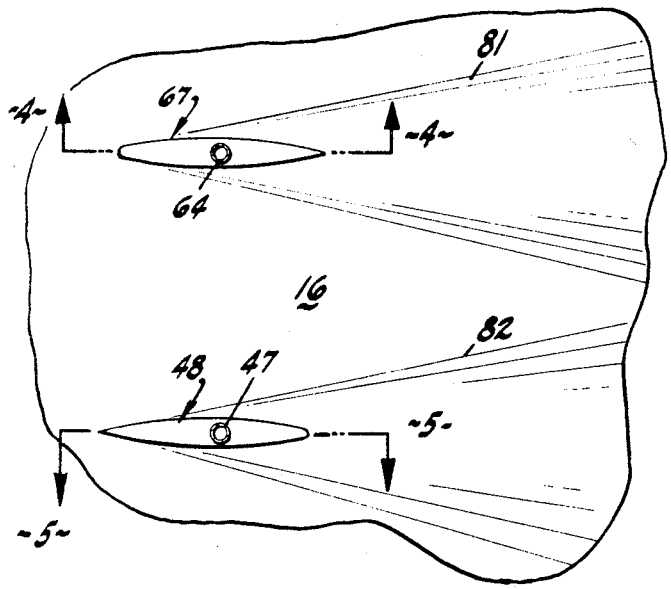
FIG-2
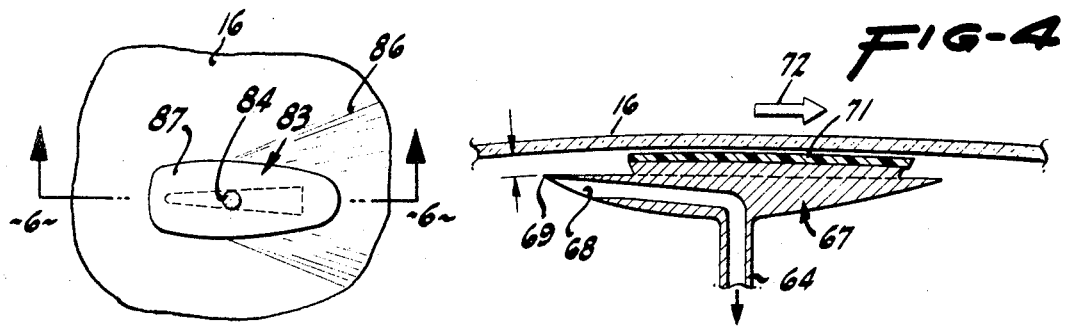
FIG-3  FIG-4  FIG-5
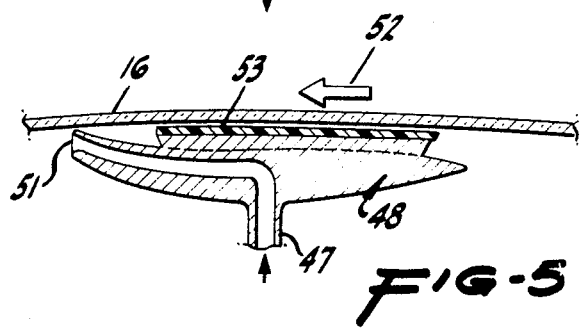
FIG-6
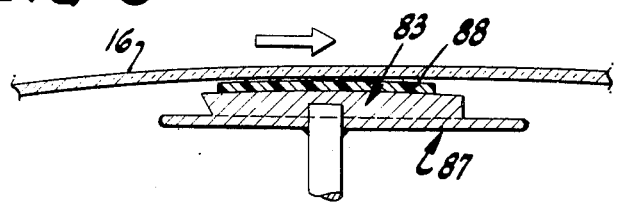
INVENTORS
WILLIAM J. OSWALD
CLARENCE G. GOLUEKE
CHARLES A. BEESON
DON O. HORNING
BY: Lothrop & West
ATTORNEYS

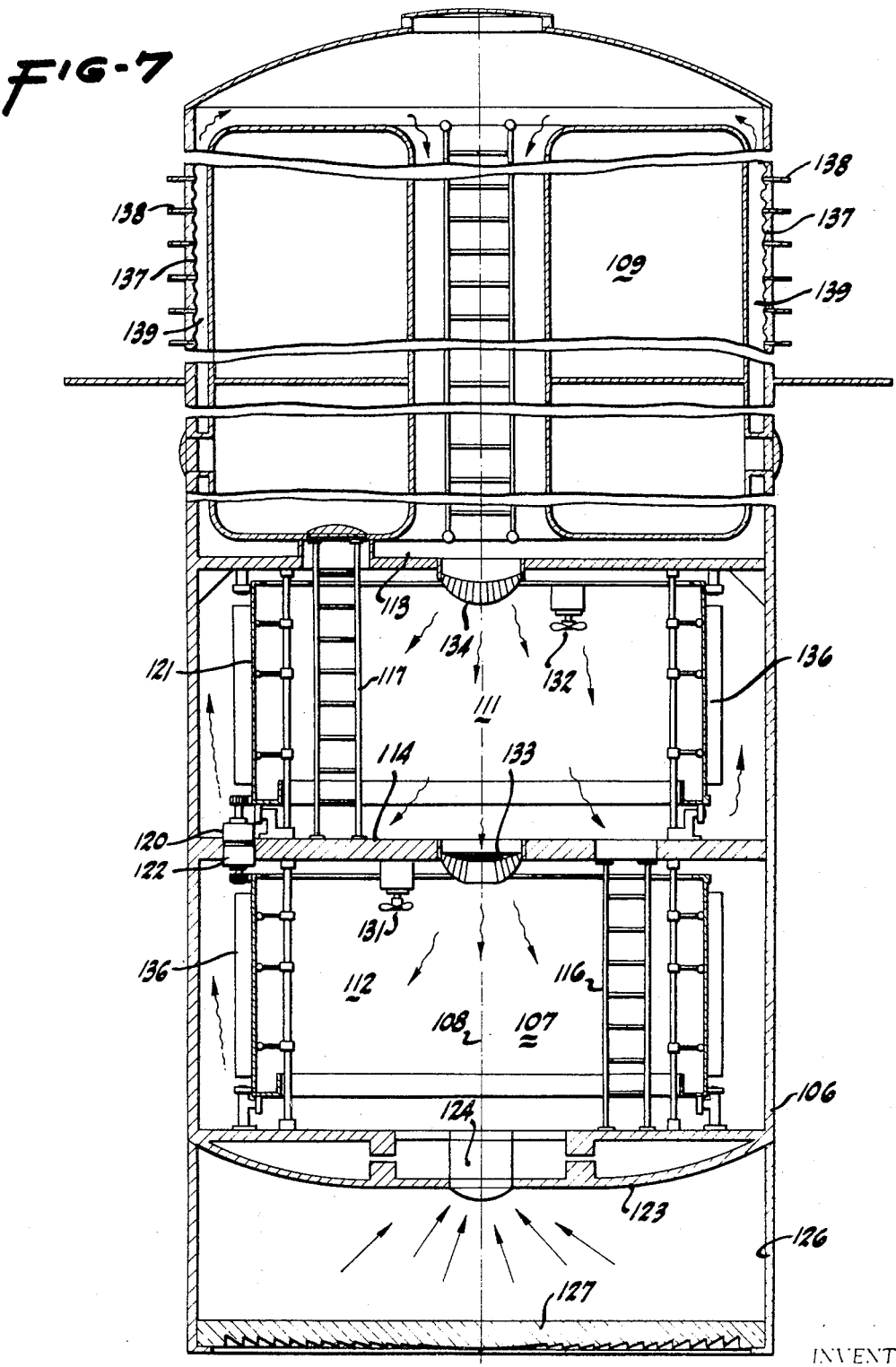

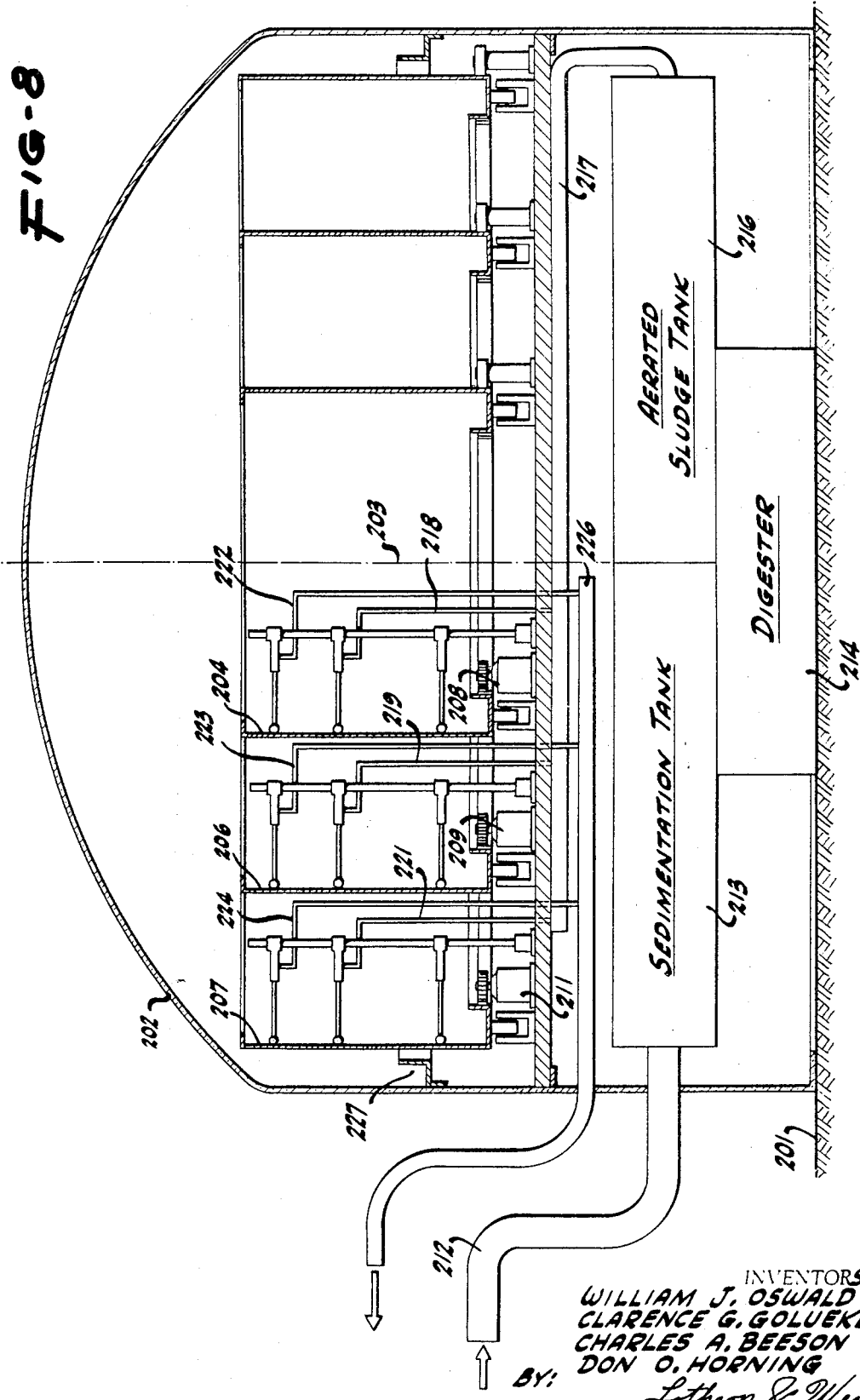

3,520,081
METHOD FOR GROWING ALGAE
William J. Oswald, Concord, Clarence G. Golueke, San Pablo, Charles A. Beeson, El Cerrito, and Don O. Horning, Berkeley, Calif., assignors to The Regents of the University of California, Berkeley, Calif.
Continuation of application Ser. No. 673,029, Oct. 5, 1967, which is a division of application Ser. No. 411,027, Nov. 13, 1964, now Patent No. 3,362,104, dated Jan. 9, 1968. This application Oct. 31, 1968, Ser. No. 772,434
Int. Cl. A01g 7/00
U.S. Cl. 47—1.4                              4 Claims

ABSTRACT OF THE DISCLOSURE

A method of growing algae includes first providing a body of liquid having a planar surface parallel to an axis, then rotating said body of liquid about said axis sufficiently to reshape said body of liquid substantially into annular form, providing algae and nutrients in said liquid and subjecting said annular body of liquid to light preferably on both sides simultaneously.

---

Our invention relates to the culture of algae which have various uses not only as food, but also as a means for absorbing carbon dioxide, producing organic growth and releasing oxygen and as a means for converting light or illumination into heat. This application is a continuation of Ser. No. 673,029, filed Oct. 5, 1967 which is a division of application Ser. No. 411,027 filed Nov. 13, 1964, now Pat. No. 3,362,104 issued Jan. 9, 1968.

Considerable work has been done in recent years with respect to the artificial culture of certain algae, particularly *Chlorella pyronoidosa* and comparable green algae, partly for economic use as cattle food and human food, for use as fertilizer, and also in more recent times as means for absorbing carbon dioxide exhaled by animals and releasing oxygen useful for breathing by animals, and further for the effective conversion of some of the energy received by the algae in the form of light or illumination into organic matter and into usable heat by reason of a temperature increase.

Attention has recently been directed to the problem of providing a suitable living environment for animals, particularly humans, in locations off of the earth, particularly space locations, wherein the force of gravity is not effective in ordinary amounts and in which an enclosed environment must be provided for sustaining human life during a protracted period. It has been considered for some time that a closed environment containing humans or other animals and also containing a culture of algae affords an appropriate symbiosis in which an interchange of oxygen and carbon dioxide is mutually beneficial and in which certain other benefits can be obtained. The normal limitations of algal culture now well recognized are virtually all based on work that has been done in connection with laboratory vessels or containers or with larger outdoor ponds. In the latter, the liquid containing the growing algae has been spread out to a considerable extent and to optimum depths, the optimum varying with culture conditions and also with the particular experiment. The culture has always involved the effect of the incident light, whether natural light or artificial light, and there have been various findings as to the preferred way to subject the culture to light, as to the preferred light intensity, as to the preferred steadiness of the light and the benefits of shading of the light or individual shadows within the culture liquid, and so on.

In view of some of the preceding work, it has occured to us that substantial improvements are possible in the apparatus and method for growing algae and in the amount of space and area required for a definite volume of algal production and for various other growth factors, providing a departure is made from the generally recognized culture methods.

It is an object of our invention to provide an improved manner of culturing algae.

Another object of the invention is to provide an apparatus for growing algae which will afford a substantial algal output with much less than the customary space and weight requirements.

Another object of the invention is to provide a method for growing algae which results in a substantially improved yield over methods heretofore disclosed.

Another object of the invention is to provide an apparatus and method for growing algae in which an environment can be provided for the satisfactory maintenance of algal, or algal-bacterial culture with animal life, particularly human life, for a protracted period of time in an enclosure.

A still further object of the invention is to provide an apparatus and method for growing algae in which the absence of gravitational effects is not deleterious.

Another object of the invention is to provide an apparatus and method for growing algae which can be operated either as a closed symbiotic cycle or as an open cycle.

Another object of the invention is to provide an apparatus and method for growing algae in which incident light is used in a highly favorable manner and without the necessity of providing large amounts of complex mechanism.

A still further object of the invention is to provide an apparatus and method for growing algae which can easily be serviced and maintained, in which a liquid body can be readily inoculated and harvesting can be carried out in a continuous fashion.

A further object is to provide for the use of algae for efficiently converting light energy into heat energy which may be used for a variety of purposes, principally water recovery.

Other objects together with the foregoing are attained in the embodiments of the invention described in the accompanying description and illustrated in the accompanying drawings, in which:

FIG. 2 is a diagram of some of the incidental apparatus utilized in FIG. 1, the figure being a cross section, the plane of which is indicated by the line 2—2 of FIG. 1;

FIG. 3 is a diagram of incidental apparatus disclosed in FIG. 1, the showing being in cross section, the plane of which is indicated by the line 3—3 of FIG. 1;

FIG. 4 is a cross section, the plane of which is indicated by the line 4—4 of FIG. 2;

FIG. 5 is a cross section, the plane of which is indicated by the line 5—5 of FIG. 2;

FIG. 6 is a cross section, the plane of which is indicated by the line 6—6 of FIG. 3;

FIG. 7 is a diagrammatic cross section on an axial plane through a modified form of the invention designed primarily for extra terrestrial operation, the view having intermediate portions removed to reduce the size of the figure; and FIG. 8 is a diagrammatic showing of another modification of the invention, the view being a cross section on a vertical, axial plane.

Figure 1:
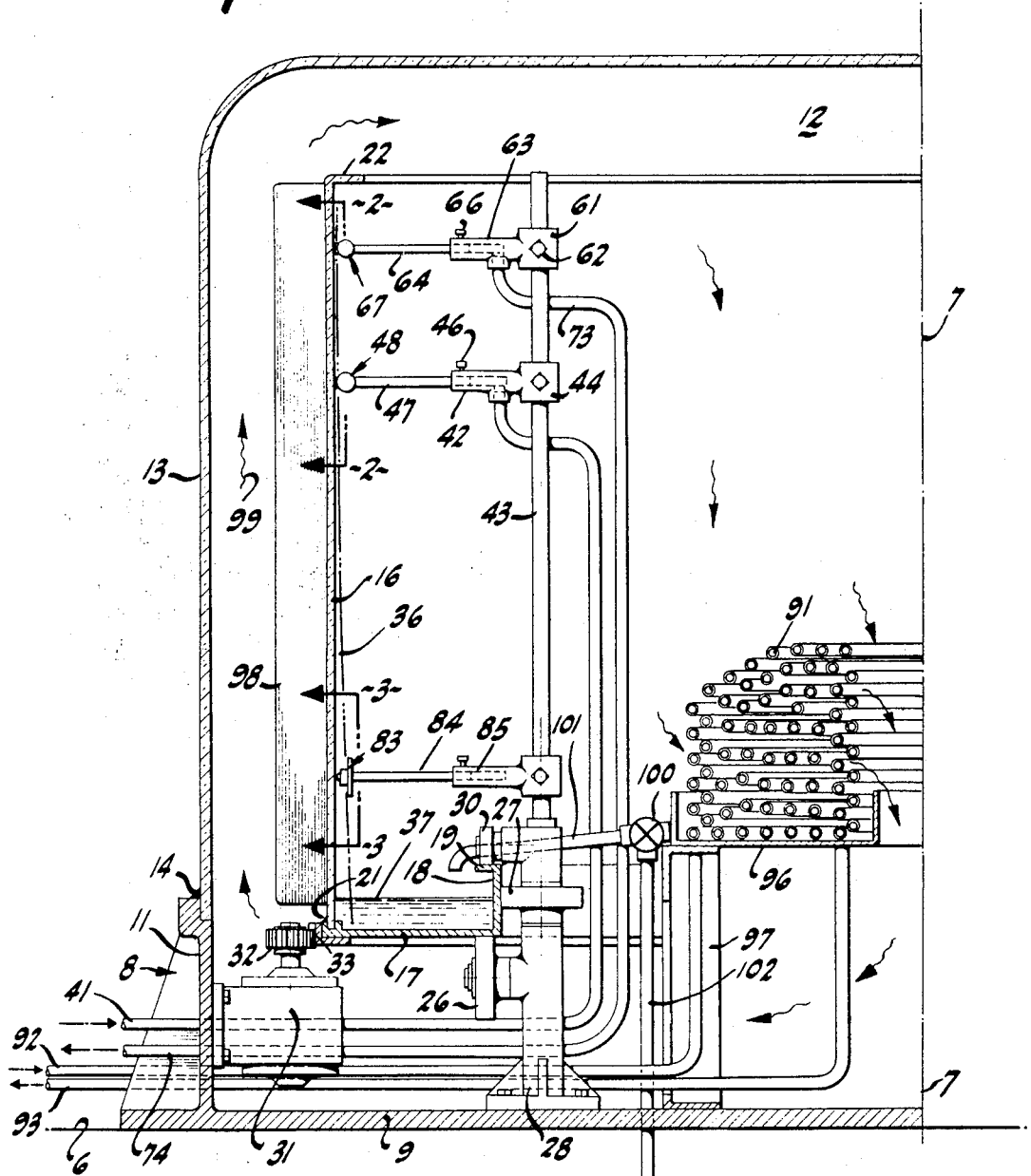
FIG. 1 is a diagram of a symmetrical apparatus showing the left side thereof in cross section on an axial plane, the axis being substantially vertical.

In one embodiment of the invention which has been successfully operated and conducted under laboratory conditions to various different scales and in various different environments, we prefer to provide an apparatus situated on a stationary floor 6 that is generally horizontal. The floor can be within an enclosed building provided with a supply of natural or artificial illumination, or the floor 6 can be a pad; for example, of concrete located outside on the surface of the earth and subjected to all of the customary environmental conditions, including light and weather.

Since the apparatus is entirely symmetrical about a central vertical or nearly vertical axis 7, the description is intended to apply generally to a complete structure, although but one half is disclosed in FIG. 1.

Situated on the floor or pad 6 is the lower portion of a frame 8 substantially circular about the axis 7 as a center. The frame has a base plate 9 and upstanding side walls 11 to serve as an appropriate base. Resting on the base and forming an enclosed compartment 12 therewith is a frame shell 13 preferably made of a translucent material such as relatively clear plastic or glass. The term "translucent" is intended to include a transparent envelope as well. The envelope is preferably joined to the base by an air tight seal 14 so that, if desired, the compartment 12 is generally isolated from the surrounding atmosphere. In many cases, the enclosure is not completely air tight, but for explanation it may be assumed that while the pressures existing within and without the shell 13 are the same or substantially so, there is only a restricted or controlled communication between the inside and the outside of the shell.

Within the shell 13 and arranged concentrically with the axis 7 is a circular cylindrical wall 16 in effect constituting a coaxial drum. As used herein, the term "cylindrical" is used to include walls that are approximately cylindrical although actually frusto-conical or paraboloid or hyperboloid, the curvature of variation usually being slight. The wall 16 is conveniently of translucent material such as clear plastic or glass. Translucent is used herein to mean light transmitting and to include transparent. The wall 16 is supported at the bottom by a trough 17 of annular form having a radially inner wall 18 with an inturned flange 19. A sealant 21 is disposed at the junction of the wall 16 and the trough 17 to afford a tight joint. The wall 16 at its upper end is preferably provided with an inturned flange 22. This can be of opaque material, but preferably is an annulus of material able to pass light. The annular trough 17 is supported for rotation on roller 26 arranged to turn on horizontal axes and companion rollers 27 arranged to turn on vertical axes. Rollers 30 are provided to prevent upward displacement in a mobile installation. The various rollers 26 and 27 are carried on supports 28 secured in a circular array on the bottom plate 9. The arrangement is such that the entire weight of the annular wall 16 and of the trough is borne on the rollers so that the drum is positioned for free rotation about the axis 7 with the wall 16 substantially parallel thereto and the bottom of the trough 17 substantially normal thereto.

Means are provided for rotating the drum, including the trough and the wall. Mounted on the frame 8 are one or more electric motors 31 supplied with electricity from any suitable source and having pinions 32 engaging a bull gear 33 secured to the drum. When the motors are energized, the drum is rotated.

It is in accordance with the invention that the wall 16 be rotated with sufficient speed so that there can be maintained on the radially inner surface of the wall 16 a layer 36 of liquid containing algae being cultured. In order to arrange this, when the apparatus is substantially stationary, a horizontal body 37 of liquid is disposed within the trough 17, the volume of liquid so disposed being sufficient to spread over the inner surface of the wall 16 to the desired thickness or depth when appropriate rotational speed has been attained. This is accomplished by energizing the motors 31 so that as the wall 16 and the drum pick up angular speed about the axis 7, the liquid 37 is changed in shape and location from its horizontal condition into a layer 36 on the inner side of the wall 16. There is so provided a relatively thin layer of liquid arrayed over the entire inside surface of the translucent wall 16. This liquid layer is utilized for the culture of algae.

In a terrestrial installation where the force of gravity is effective, the layer 36 is shaped in accordance with the resultant of the centrifugal force acting upon the liquid and the gravity force acting thereon. The layer is radially thinner at the upper end of the drum that it is at the lower end of the drum, the thickness varying or increasing from top to bottom. The cross sectional shape of the layer (as seen in FIG. 1) approximates that of a very thin trapezoid, although the inner surface is actually a paraboloid of revolution. Mathematical terms used herein are designed to afford an approximation of the shapes involved rather than to be minutely accurate. In most cases, the difference in radial depth or thickness of the layer near the top of the wall 16 and near the bottom of the drum is relatively uniform and does not materially affect the culture. If uniform layer thickness is desired, the drum wall can be made frusto-conical or even paparaboloid. In case of considerable height, there can be provided annular separators at successive elevations.

Under one procedure, the liquid body 37 is comprised of water and various nutrients and has an inoculum of algae together with bacteria which are transferred to the substantially vertical layer when the wall is accelerated. Alternatively, the body of liquid 37 may not initially contain any algae and the algae for culture can be added to the liquid body when it is in annular layer form against the wall 16. In either mode of accomplishment, there is provided a culture layer of algae confined against a single wall 16. The culture is subject to transmission of light from that side through the translucent wall. The culture is not confined on the other surface at all, but is exposed to the atmosphere within the compartment 12 and is thus subject to illumination or light on that side also. Thus the culture layer is illuminated on both sides but is physically supported by a material wall on one side only.

In order to supply the culture medium with nutrients and with carbon dioxide for the growth of the algae, a conduit 41 is brought in through the wall 11 and extends to a fixture 42 supported on a vertical rod 43 rising above the base support 28 and through the center of the roller 27. One or more upright rods 43 can be provided. A clamp 44 is variably movable around and axially along the upright rod 43 so that the conduit 41, which may in part be flexible, is disposed at a suitable height and location. Extending from the fixture 42 in a generally radial direction and adjustably held by a clamp screw 46 in the fixture is a tube 47 leading to an inlet scoop 48, as shown particularly in FIGS. 2 and 5. The scoop 48 has a generally streamlined form and is mounted at the end of the tube 47 which communicates with a discharge opening 51 in the immediate vicinity of the wall 16. The opening is spaced only slightly from the wall and thus discharges its contents into a space very close to the wall 16. When the wall operates in the direction of the arrow 52 in FIG. 5 (for example), the liquid discharged from the opening 51 merges with the liquid layer on the wall.

Preferably, the mechanism is so adjusted that there is a very slight physical clearance between the scoop 48 and the wall in order that there be no wear. Should there be an accidental displacement of the parts, an antifriction shoe 53 on the scoop 48 contacts and operates against the wall 16. The friction is slight so that there can be rubbing contact for a considerable period without producing any deleterious effects. The liquid flowing in through the pipe 41 joins the liquid layer on the inner side of the wall 16. This liquid can contain various nutrient materials for the growth of the algae or algae-bacteria combination. It can also, if desired, include algae or bacteria for inoculation purposes, and can also carry in entrained carbon dioxide if none is supplied otherwise to the interior of the compartment 12.

Preferably, material is removed from the layer 36 at approximately the same rate that material is added to the end that the radial thickness of the layer will remain substantially constant and at an optimum or predetermined value. For that reason, on the upright support 43 there is provided another clamp 61 adjustably held by a screw 62 and having a hollow fitting 63 from which a pipe 64 extends a variable amount as held by a set screw 66. A scoop 67 substantially as shown in FIGS. 2 and 4 is provided at the end of the pipe 64. This is approximately the same contour as the scoop 48 but at a somewhat different location has an inlet opening 68 defined by relatively sharp edges 69 of the scoop. An antifriction shoe 71 is provided on the scoop in the event that the normal clearance between the scoop and the wall 16 is lost.

Due to the direction of rotation of the wall 16 as indicated by the arrow 72 in FIG. 4, for example, liquid and liquid contents are educted from the revolving layer and are driven into the opening 68 and through the pipe 64 into a return conduit 73 supported on the bracket 63 and having some flexible portions. The conduit 73 emerges from the wall 11 as a pipe 74. Material discharging from the pipe 74 can go to any suitable sort of apparatus for separating and recovering the contained algae from the remaining fluid. Since this type of apparatus is well known, it is not disclosed in detail herein. The separated liquid can be returned to the culture layer.

It is presently considered important that the culture layer 36 be subjected to substantial turbulence to afford improved growing conditions for the algae and to effect a suitable distribution of the materials in the layer and added to the layer from time to time so that the layer is always virtually homogeneous. The scoops 48 and 67, although somewhat streamlined, are effective, as shown in FIG. 2, to produce substantial wakes 81 and 82. The scoops are normally positioned so that the wakes interfere with each other at appropriate points and the material of the culture body is thus agitated, made turbulent and mixed.

Further than this, we often provide a particular drag 83, as shown in FIGS. 3 and 6, for the express purpose of generating an extraordinary wake and corresponding turbulence. The drag 83 is situated on a support 84 carried by a bracket 85 on the upright 43 and is disposed at a convenient point near but not touching the wall 16. The drag is usually located in a lower portion of the drum wherein the culture layer is a little thicker. The drag 83 itself is not streamlined. It is blunt and induces a wide wake 86 effective throughout substantially the entire axial extent of the culture layer. Splashing is to be avoided, partly because of the inadvertent dissipation of material. A splash shield 87 is provided as an integral portion of the drag 83, and an antifriction shoe 88 is provided in the event the clearance between the drag and the wall is lost.

Because the layer 36 is maintained against the wall 16 by centrifugal force, it is completely exposed on the inside. If the apparatus is of sufficient size, an attendant can readily enter into the compartment 12 and can adjust the various scoops and drags and can attend to other operating factors during the rotation of the drum. Should there be a sudden interruption in the operation of the device, and should the drum slow down abruptly and stop, the culture layer 36 reverts into a horizontal body 37 as before, the capacity of the trough 17 being sufficient to accommodate all of the falling material. Thus there is no loss and vertical layer culture can be resumed when the rotation of the drum is resumed.

Cultures of this sort can continue and can be maintained for a protracted period with a substantially constant rotation of the drum once the drum has achieved its predetermined speed.

Not only are the growing algae provided with the customary nutrients and carbon dioxide and also with adequate incident light, but also an optimum temperature within the compartment 12 is maintained. Part of the light falling upon the algae in the culture layer is converted by the growing algae into heat. Means are provided to extract surplus heat; for example, by simple evaporation, from the culture layer so that the temperature thereof remains substantially constant.

Disposed within the compartment 12 and conveniently symmetrical with the axis 7, although not necessarily so, is a heat exchange unit 91. This is a body of coils of the usual sort having a cold refrigerant inlet 92 outside of the base and a warm refrigerant return conduit 93 also outside of the base. The mechanism for extracting heat from the refrigerant circulating through the conduits 92 and 93 and through the coil body 91 is of standard construction and so is not disclosed. The coil body is preferably supported on an annular tray 96 suitably carried by legs 97 upstanding from the base plate 9. Because of the circulation of refrigerant, the heat exchange coil maintains a predetermined, relatively low temperature.

The rotation of the drum within the compartment 12 induces the flow of air and there is some thermal air flow. Air flow is preferably forced or augmented by vanes 98 of good thermally conducting material spaced around and secured to the outside of the wall 16. The vanes themselves are preferably translucent or, if opaque, are made of relatively thin material and are spaced widely apart so as to interfere only a small amount with the transmission of light to the culture. The vanes 98 in rotating with the drum induce a circulation of air which occurs in the direction of the various flow arrows 99 in FIG. 1. The circulation is upwardly along the vanes 98 and along the outside of the wall 16 as the circulating air acquires heat and its temperature rises. The flow is then across the top of the compartment 12 within the enclosing shell 13 and then is downwardly over the coil body 91.

Rotation of the drum also causes substantial agitation of the liquid particularly at the interface between the liquid and the air, since the air lags the liquid. This substantially promotes gas and heat interchange and is an advantage of the revolving drum.

In flowing over and through the coils of the body 91, the circulating air gives up the heat acquired from the algae culture and such heat is transferred out through the conduit 93. The then cooled air recirculates as previously indicated. Thus, the heat acquired from the illumination and given off by the algae is transferred out of the compartment 12 so that the atmosphere or environment within the compartment is sustained close to the desired temperature.

Since the algae in growing maintain a relatively humid condition of the circulating air, there is a deposit of moisture onto the coil body 91 as the air flowing thereover is cooled. This moisture condenses on the coils and is caught in the tray 96. Flow from the tray is controlled by a valve and may partially or entirely pass through a discharge pipe 101 back to the trough 17 from which it is incorporated in the body of liquid on the wall 16. The valve 100 can also be positioned to direct liquid from the tray 96 through a drain pipe 102 to a tank 103 wherein the condensate can be retained or withdrawn for any desired use. There is thus provided a moisture cycle within the compartment 12, any excess liquid being removed through the drain pipe 102.

The device as shown in FIG. 1 can be operated for a protracted period under substantially constant or uniform conditions with the algal growth being withdrawn through the discharge pipe 74. It is sometimes desirable after extended operation to shut down the structure, permitting the liquid to gather in the trough 17 with the contained algae and then to scrape excess algae which may have adhered to the wall 16 from the interior thereof. This surfacing operation need not be often accomplished. If desired, a layer of algae can be permitted to build up on the wall 16 for later harvesting.

The apparatus substantially as shown in FIGS. 1 to 6 and as heretofore described can be somewhat modified for inclusion in a space vehicle and for extra terrestrial operation in a substantially gravity free and substantially air free environment as shown in FIG. 7.

In this structure, a relatively large enclosing capsule 106 is provided with virtually opaque walls capable of isolating the interior volume or compartment 107 of the device from the exterior. The structure is conveniently made symmetrical about a central longitudinal axis 108 which may align with the direction of the gravitational force if in a gravitational environment, or may have no relationship to any gravitational forces whatsoever when the enclosure is in space.

The interior of the enclosure is divided into a number of rooms 109, 111 and 112 by cross partitions 113 and 114 and communicating in various ways, particularly by means of ladders 116 and 117, so that the human occupants of the various rooms can travel freely back and forth between them.

Disposed in rooms 111 and 112 are substantially duplicate culture devices. Each of these includes a generally circular cylindrical wall 121 concentric with the central axis 108 of the enclosure 106 and mounted as previously described for rotation about the axis. Separate drive motors 120 and 122 are afforded for simultaneous rotation of the two walled structures in opposite directions. The algal culture is conducted under centrifugal force along the radially inner surface of the the walls 121 and without regard to the value of any gavity or gravitational force. The layer of culture liquid is very nearly uniformly thick or deep except for surface ripples when there is no gravity.

The nutrients are supplied to and the algae are withdrawn from the liquid layer on the wall just previously described, but the illumination and the cooling are somewhat different.

Since it is necessary to provide an aperture in the casing 106 for the admission of light, and since for structural reasons a large opening is impossible, the capsule is provided with an intermediate wall 123 in which a condensing lens mechanism 124 is axially mounted. The opening for the lens is of an acceptable diameter from the standpoint of mechanical strength and atmospheric sealing capability. In order to transmit sufficient light through the relatively small lens 124, the body 106 has a subframe 126 mounting a Fresnel or similar lens 127 concentric with the axis 108 and at an appropriate distance from the condensing lens 124. The effect of this optical arrangement is to take the light incident on the Fresnel lens 127 and to transmit it through the condensing lens 124 to illuminate the interior of both of the rooms 111 and 112 with some incidental illumination within the room 109. The light source is thus effective upon all of the algal cultures within the capsule 106.

In order to circulate air within the confines of the body 106, a plurality of fans 131 and 132 are provided. These are effective to blow the air in a generally downward direction along the central portion of the structure, there being diffusing vanes 133 and 134 provided at appropriate locations so that the air is well distributed and flows at a uniform velocity. The air flow is generally downwardly along the axis 108 and across the cylindrical culture walls and then upwardly on the outside thereof along cooling fins 136 so that the temperature of the air ascending along the immediate inside of the capsule 106 is relatively high. The warm air travels upwardly along the inside of the outer wall of the capsule 106 outside of the room 109 and its heat is radiated to space through a relatively thin heat transferring wall 137 having external radiating fins 138 thereon. The energy received as light and converted into heat by the algae is thus re-radiated to space and the air within the air passage 139 is cooled to a low temperature. The cool air then returns through the center portion of the room 109 and diffuses through the vanes 134 and 133 for reheating.

With an organization substantially as shown in FIG. 7, it is expected that animal occupants, particularly men, can live comfortably within the interior of the capsule in symbiosis with the algal or algal-bacterial culture, there being an exchange of carbon dioxide and oxygen, there being maintained an appropriate living temperature, there being an exchange of nitrogenous materials if desired, and there being maintained pleasant and effective surroundings of a bright nature, the greenish walls of the algal culture being phychologically acceptable. Mechanically, the arrangement is effective since men within the various rooms can readily have access to any portion of the algal culture at any time for attention of any sort. In the event of failure of one of the units, for example in the room 111, the culture is not lost, but is retained and the other unit continues its operation.

In some instances it is desired to have an algal or algal-bacterial culture arrangement disposed in a very compact form. There is described in the literature an effective symbiosis between some algae and sewage wastes. More recently it has become important to arrange a symbiosis between algae and bacteria in sewage so that the algae consume all of the nutrients available in the sewage, leaving an effluent on which further algae cannot be sustained. It is important economically to conduct such a symbiosis in a relatively compact manner. For example, the algal portion of a symbiosis of algae and bacteria in sewage of the sort previously known because of the light requirements and other factors often occupies more real estate than can properly be afforded. Pursuant to the present arrangement, the requirements for ground surface are drastically reduced. As particularly illustrated in FIG. 8, it is feasible to provide an installation on the ground 201. This includes an enclosing dome 202 of transparent or translucent material generally symmetrical about a central axis 203. Within the dome are disposed in concentric array a number of annular walls 204, 206, 207, all mounted similarly to the previously described structure and one revolving inside the other, being driven by individual motors 208, 209, 211. The rates of rotation of the various walls about the axis are such that each has substantially the same peripheral speed. The algae or algal bacteria cultures are maintained as before, but among the nutrients are supplied sewage constituents or conventional sewage treatment residuals or organic wastes or comparable materials.

For that reason, raw sewage is brought in through an entry conduit 212 and is put through a diagrammatically represented activated sludge treatment plant. This is of the customary sort conveniently located outside of and immediately adjacent to the dome 202 and preferably located within the dome 202, as shown. A sedimentation tank 213, a digester 214 and an aerated sludge tank 216 of customary style are interconnected and provided with auxiliaries in the usual way. The operation of the sludge plant provides liquids and gases most of which are useful in the algal culture. Usable gas can rise directly, but for illustration the usable gaseous and liquid efflux from the treatment plant is through a manifold conduit 217 from which conduits 218, 219 and 221 respectively take off to supply the various annular walls 204, 206 and 207. The symbolic culture of the bacteria and the algae using the sewage constituents continues on the various walls. The culture produced is withdrawn through a number of conduits 222, 223 and 224 individually connecting to a manifold conduit 226 leading to a convenient point of discharge. The concentric arrangement of the various culture walls is such as to afford a large area of culture exposed on both sides to light and since the walls extend a considerable distance vertically above the surface of the earth, the actual ground area occupied by the entire plant is relatively small and is economically feasible.

The water evolved is treated in substantially the same way as it is treated in connection with the FIG. 1 device, there being provided a catch basin 227 to garner the condensate running down the wall of the dome 202.

What is claimed is:

1. A method for growing algae, comprising the steps of: establishing a body of liquid containing algae; rotating said body about an axis at such speed that centrifugal force applies a propelling force to substantially all of the liquid of said body in a direction radially outwardly of said axis; interposing means, outwardly of said axis, in position to restrain outward movement of said liquid and to confine substantially said entire body to a generally cylindrical thin layer of liquid concentric to said axis; and directing visible light onto at least the inner surface of said layer of liquid.

2. The method defined in claim 1 including the further step of directing visible light onto the exterior surface of said layer of liquid.

3. The method defined in claim 1 including the further step of inducing turbulence in said layer of liquid while it is rotating.

4. The method defined in claim 1 including the steps of adding liquid to said layer and removing liquid containing algae therefrom, at comparable rates.

References Cited

UNITED STATES PATENTS

| | | | |
|---|---|---|---|
| 2,686,754 | 8/1954 | Monod | 195—143 |
| 2,732,662 | 1/1956 | Myers et al. | 47—1.4 |
| 3,218,758 | 11/1965 | Konikoff | 47—1.4 |
| 3,362,104 | 1/1968 | Oswald et al. | 47—1.4 |

ROBERT E. BAGWILL, Primary Examiner

U.S. Cl. X.R.

195—135